United States Patent [19]

Krautsack

[11] 4,307,900
[45] Dec. 29, 1981

[54] PROMOTIONAL COUPON VEHICLE

[75] Inventor: Richard G. Krautsack, Arlington Heights, Ill.

[73] Assignee: The Cooperative Marketing Co., Grove Village, Ill.

[21] Appl. No.: 94,737

[22] Filed: Nov. 19, 1979

[51] Int. Cl.³ .......................... B42D 15/00; G09F 3/00
[52] U.S. Cl. ..................................... 283/56; 283/1 R; 40/306
[58] Field of Search ............... 40/2 B, 16, 16.4, 124.1, 40/310, 306; 283/56, 22, 21

[56] References Cited

U.S. PATENT DOCUMENTS

| | | | |
|---|---|---|---|
| 3,520,560 | 7/1970 | Isaac | 283/63 R X |
| 3,702,511 | 11/1972 | Miller | 40/306 |
| 3,753,305 | 8/1973 | Meuh | 40/124.1 X |
| 3,807,771 | 4/1974 | Greason | 283/56 |
| 3,914,483 | 10/1975 | Stepek | 283/21 X |
| 3,994,089 | 11/1976 | Schwartz | 40/310 |
| 4,004,058 | 1/1977 | Buros et al. | 283/21 X |
| 4,195,864 | 4/1980 | Morton et al. | 283/56 |

Primary Examiner—Paul A. Bell
Assistant Examiner—John S. Brown
Attorney, Agent, or Firm—Fitch, Even, Tabin, Flannery & Welsh

[57] ABSTRACT

A promotional coupon vehicle designed for display in association with a particular product line or for distribution by mail or other media to consumers. A first surface region illustrates the particular product and offers a discount on a purchase of the product line. A second surface region is delineated to receive and hold some portion of the packaging material of the product line. Adhesive carried by the second region facilitates attachment of the packaging material. The combination of the coupon vehicle and the attached packaging material is acceptable for a discount on the product line.

4 Claims, 5 Drawing Figures

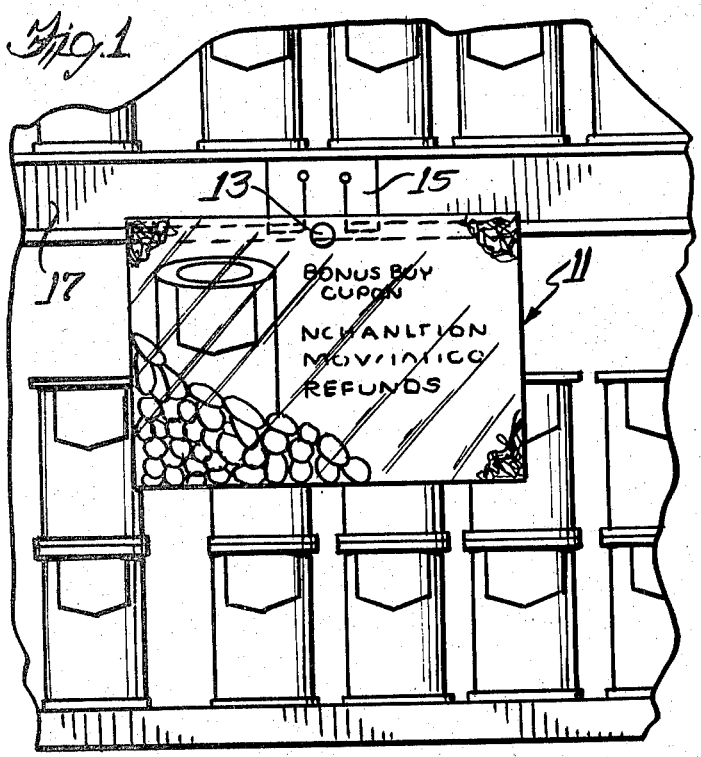
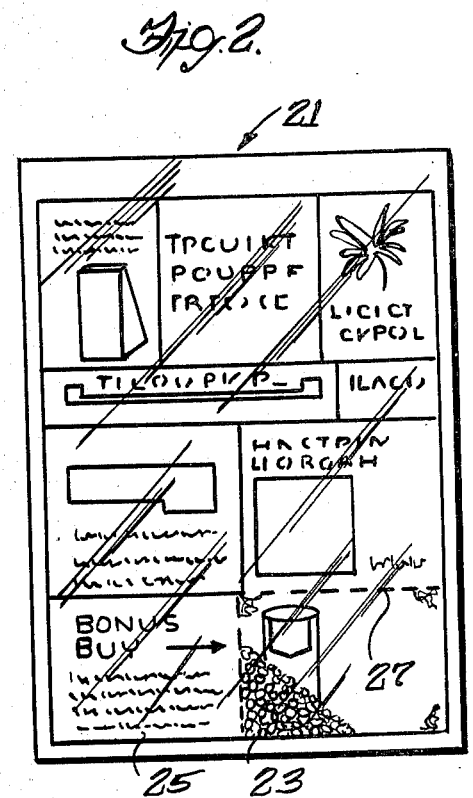
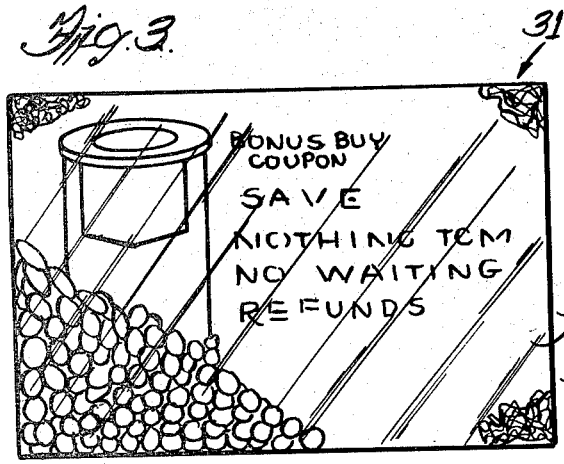
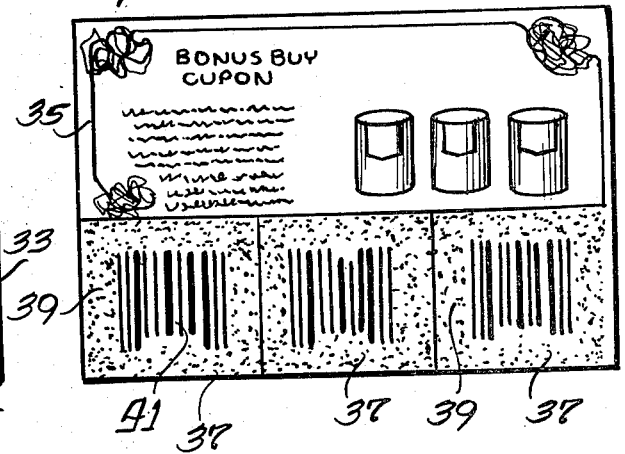
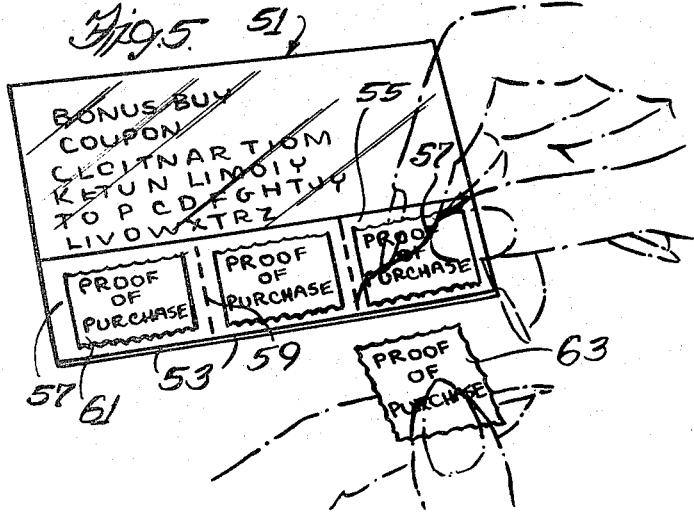

PROMOTIONAL COUPON VEHICLE

BACKGROUND OF THE INVENTION

This invention relates to coupon vehicles for providing a discounted price or some other related value upon purchase of a particular product line being promoted.

It has become increasingly common in the United States for coupons, such as "cents-off" coupons, to be distributed by direct mail advertising, in local newspapers, in magazines, and in point-of-sale displays and the like for the purpose of promoting the sale of a particular product or product line. The coupons may authorize a reduced price on the purchase of a particular product or combination of products, may offer one unit free with the purchase of one or more units, or may provide for a return of a portion of the purchase price by mail after certain requirements are met. In this time of steadily rising inflation, the public has become quite conscious of such coupons, and improvements in such methods for promoting products have been actively sought.

BRIEF SUMMARY OF THE INVENTION

The invention provides a promotional coupon vehicle which illustrates a particular product line in a first region thereof. A second region of the coupon is delineated for the application thereto of some portion of the packaging material, e.g., wrapper, label, box, etc., as evidence of the purchase of the product. Adhesive means is carried by this second region to facilitate attachment of the packaging material thereto, and the combination of the coupon vehicle plus the adhesively attached sections of packaging material is acceptable for the offered value, e.g., as a part of the subsequent purchase price of items from the product line.

DESCRIPTION OF THE DRAWINGS

FIG. 1 is a front view showing an assemblage of coupon vehicles embodying various features of the invention, being located as a part of a point of display arrangement on a supermarket shelf;

FIG. 2 is an illustration of a similar coupon vehicle embodying various features of the invention shown as a part of a multiple coupon, direct distribution arrangement;

FIG. 3 is an enlarged view of the front side of the coupon vedicle illustrated in FIG. 1;

FIG. 4 is a similar view of the rear side of the coupon vehicle shown in FIG. 3; and FIG. 5 is a perspective view illustrating the attachment of a proof of purchase seal or the like to an alternative embodiment of a coupon vehicle generally similar to that illustrated in FIG. 4.

DETAILED DESCRIPTION OF THE PREFERRED EMBODIMENTS

FIG. 1 illustrates a pad 11 of sheets which are supported on a pin 13 that is carried by a plate-like support 15 which is adapted to be easily snapped into the price channel 17 at the front edge of the usual supermarket shelf. The support 15 itself is disclosed in detail in U.S. Pat. No. 4,016,977, issued Apr. 12, 1977. The individual sheets each constitute a coupon vehicle embodying various features of the invention and are designed to be pulled off, one by one, from the support pin 13 by slightly tearing the sheet above the hole through which the pin protrudes. The front surface of the sheet illustrates a particular product line, and the overall assemblage is such that it is designed for a point-of-sale display in association with units of that particular product line.

An alternative way of distributing a coupon vehicle is as a part of a shared promotional arrangement such as the sheet 21 illustrated in FIG. 2. A coupon vehicle 23 and a related advertisment 25 constitute approximately the lower one-third of the composite sheet 21 which illustrates and promotes several products. The coupon vehicle 23 is located in the lower right-hand corner of the composite sheet 21 and can be made separable from the rest of the sheet by perforations 27 or the like. The composite sheet 21 may be distributed in a variety of ways, such as by direct mail, by inclusion in a magazine or periodical, by stuffing in a local newspaper or the like.

Depicted in FIGS. 3 and 4 is a coupon vehicle 31 which is representative of one which might be included as a part of an assemblage, such as that shown in FIG. 1, or as a part of a composite sheet, such as that shown in FIG. 2. The coupon vehicle 31 is made of sheet material, e.g., paper or fiberboard and has a front surface 33 which is illustrated in FIG. 3 and a rear surface which is illustrated in FIG. 4. The front surface 33 constitutes a first region of the sheet which illustrates and promotes the product line, for example, canned kidney beans, and which describes the offer that is being made. The rear surface 35 of the coupon vehicle continues with the description of the product line and the offer but contains a second region designated for attachment of a portion of the package dress or packaging material of the specific product of the product line being promoted.

The rear surface 35 of the illustrated coupon vehicle 31 is printed to designate three subregions 37 proportioned to accommodate a specific part of the label from the canned product—in this instance the UPC code. Each of these subregions 37 is provided with a layer of adhesive 39 suitable for attachment of the UPC code portion of the label to the rear surface of the coupon vehicle 31. In FIG. 4, the adhesive layer 39 is indicated by stippling, and the pattern of the adhesive may be any desired, for example around the border of each subregion 37. However, preferably, the adhesive layer 39 is transparent and the subregion is preferably printed with the facsimile 41 at the portion of the packaging material to be attached. In such case, the adhesive pattern covers substantially the entire subregion 37 but the facsimile 41 can be seen therethrough.

In the FIG. 4 embodiment, the adhesive 39 is one which is water-activatable, such as that which is found along the edge of the sealing flap of the ordinary envelope. The inclusion of the facsimile 41 in the subregion 37 quickly identifies to the recipient of the coupon vehicle what portion of the package dress is required, and thus aids in the understanding and acceptance by the general public of this type of a coupon vehicle. Moreover, by printing a facsimile of a UPC code that is generally but not precisely the same as that which is found on the product in question, authentication of the returned coupon vehicles by an optical reader is possible. The ready means of attachment that is provided by the adhesive layer 39 facilitates the use of the coupon vehicle by the recipient and encourages the recipient to take advantage of the promotion.

Depicted in FIG. 5 is an alternative embodiment to the coupon vehicle shown in FIG. 4. In this embodiment the rear surface of a coupon vehicle 51 is provided with three subregions 53 proportioned to receive a "proof of purchase" seal, such as is found on many packages and labels today. The three subregions 53 are covered with a layer 55 of pressure-sensitive adhesive which is covered with a release strip 57 that is perforated at 59 to provide three separable sections each overlying one of the subregions. In the illustrated embodiment, a facsimile 61 of the proof of purchase is printed on the release strip 57, and the same facsimile is also printed on the surface of the coupon vehicle 51 itself and can be seen through the clear adhesive layer 55. However, if desired, the facsimile 61 might be printed only on the release strip 57. Alternatively, a release strip made of transparent material could be used, and the facsimile could be printed only on the surface of the coupon vehicle. Because of the sectionalized nature of the release strip 57 as a result of the perforations 59, it is simple for the recipient to separately remove only a third of the strip, covering one of the subregions 53, allowing attachment of one proof of purchase 63 while protecting the adhesive layer carried by layer 55 carried by the other two subregions until ready for use.

Although the coupon vehicle has been referred to broadly as offering a discount on a future purchase of the product, once the required number of portions of the package dress have been attached to it and although this use is preferred, the terminology "discount" is to be interpreted broadly and is not to be narrowly construed to mean merely a specified number of cents to be deducted from the price of the future purchase. The term should be understood to include offers wherein a unit is obtained free when a future purchase of one or two units is made. Likewise, it should be understood to include situations wherein the completed coupon vehicle can be exchanged for a value, such as a right to a free unit, or wherein a subsequent purchase of the product allows the purchaser to receive a free unit of a different product from the product line. Preferably, however, the offer is linked to a future purchase of the same product which is being promoted because, in this fashion, it is believed that the coupon vehicle has its greatest attraction. When used in this manner, the distribution of the coupon vehicle to the recipient, by a point of sale display or otherwise, encourages the recipient to make an initial purchase of the product line, for example three cans of canned kidney beans. As each unit of the product is used, the purchaser removes the appropriate portions of the label from each can and attaches it to the coupon vehicle. Thereafter, the attraction of a future purchase at a discounted price furthers the promotion by encouraging a second purchase of the product as a result of the distribution of a single coupon vehicle.

Although the invention has been illustrated with respect to certain preferred embodiments, which constitute the best mode presently known to the inventor, it should be understood that various changes and modifications as would be obvious to one having the ordinary skill in this art may be made without departing from the scope of the invention which is defined solely by the appended claims.

Various features of the invention are emphasized in the claims that follow.

What is claimed is:

1. A promotional coupon vehicle designed for use with a particular packaged product line, which coupon vehicle comprises coupon means having first and second printed regions, said first region illustrating the particular product line and offering a discount on a future purchase of said product line, said second region carrying printed indicia of some portion of the packaging material of the product line, a packaging material portion as indicated by said indicia, and means attaching said packaging material portion to said second region, whereby the combination of said coupon means and attached packaging material is acceptable for said offering described in said first region.

2. A coupon vehicle in accordance with claim 1 wherein adhesive originally carried by said second region constitutes said attaching means.

3. A coupon vehicle in accordance with either claim 1 or 2 wherein said indicia is a facsimile of the UPC code appearing on said packaging material.

4. A coupon vehicle in accordance with either claim 1 or 2 wherein said coupon means is planar and wherein said first and second regions are on opposite surfaces of said planar coupon means.

* * * * *